United States Patent Office
3,662,052
Patented May 9, 1972

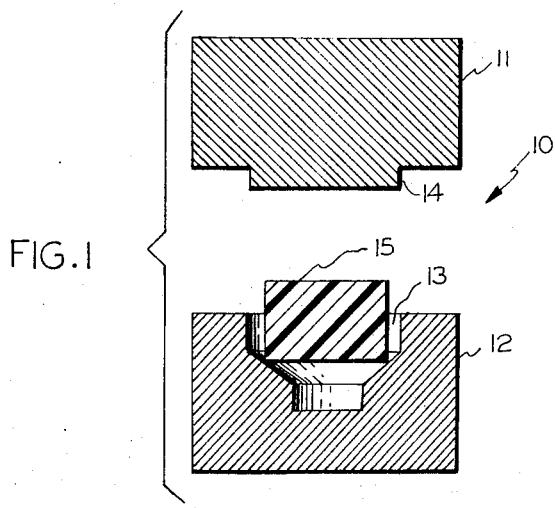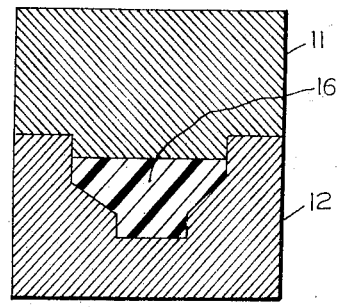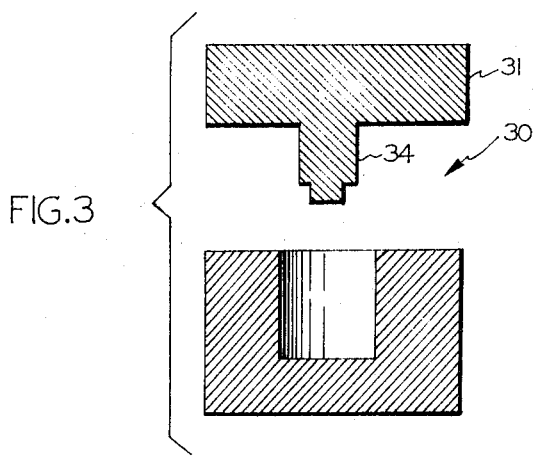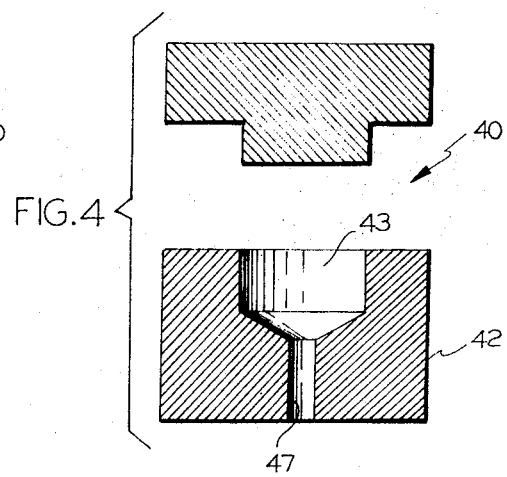

1

3,662,052
IMPACT MOLDING OF OXYBENZOYL POLYESTERS
Bernard E. Nowak, Lancaster, and James Economy and Steve G. Cottis, Buffalo, N.Y., assignors to The Carborundum Company, Niagara Falls, N.Y.
Filed May 28, 1969, Ser. No. 828,632
Int. Cl. B29f 5/02; C08g 17/00, 39/00
U.S. Cl. 264—119
10 Claims

ABSTRACT OF THE DISCLOSURE

Processes for forming shaped polyester articles of an oxybenzoyl polyester comprising compressing granules of the oxybenzoyl polyester into a slug and impact compressing the said slug into a desired shape by imparting to said slug an energy of from 10,000 foot pounds to 150,000 foot pounds.

---

Oxybenzoyl polyesters are known in the art but only according to certain recently discovered techniques, it is now possible to produce oxybenzoyl polyesters of high molecular weight and advantageous high temperature properties. These high molecular weight polyesters possess many physical and chemical properties which render them especially suitable for a large variety of engineering applications. For instance, these oxybenzoyl polyesters are inert to virtually all solvents and most acids. They possess a high dielectric strength, a low dissipation factor, and a high thermal conductivity. Thus, these polyesters are useful as substrates for printed circuits, insulation for electrical wires, and as high temperature bearings requiring no external lubricant. However, the polymerization processes by which these oxybenzoyl polyesters are produced yields them in a granular or particulate form. Thus, considerable effort has been expended to find methods for fabricating these granules into shaped articles such as bearings, printed circuits, and the like. Conventional plastic forming techniques are not suitable since these polyesters thermally degrade at temperatures lower than their observed melting points. Sintering at high temperatures has been suggested but has met with only limited success because the temperatures employed which are generally about 800° F. tend to cause thermal degradation and/or undesirable side reactions in the polyester. An additional disadvantage to sintering is the relatively long period of time which increases processing costs. Compression molding has not proved practical because of the long residence times and high temperatures necessary, even at pressures above 6,000 p.s.i.

It is therefore an object of the present invention to provide an improved process for forming shaped articles of an oxybenzoyl polyester which process is substantially free of one or more of the disadvantages of prior processes.

Another object is to provide an improved process for forming shaped polyester articles which process does not require the use of high temperatures.

A further object is to provide an improved process which can be conducted at temperatures at which side reactions do not take place in the polyester.

A still further object is to provide an improved process for producing shaped articles in a much shorter period of time than heretofore required.

Yet another object is to provide an improved process for forming shaped polyester articles which are substantially void-free.

Additional objects and advantages of the present invention will be apparent to those skilled in the art by reference to the following detailed description thereof and the drawings wherein:

2

FIGS. 1 and 2 are schematic representations of an apparatus suitable for practicing the process of the present invention;
FIG. 3 is a schematic representation of another apparatus suitable for practicing the process of the present invention; and
FIG. 4 is a schematic representation of yet another apparatus suitable for practicing the process of the present invention.

According to the present invention, it has been discovered that shaped articles of oxybenzoyl polyester can be formed by impact compressing granules of the polyester. The impact compressing is generally accomplished by disposing the polyester between two dies which are in opposing face-to-face relationship and then abruptly forcing at least one of the two dies towards the other so as to impact the polyester between the dies. This impacting of the polyester causes rapid deformation of the polyester by impact energy. This process requires only a short amount of time and can be conducted at room temperature, thus avoiding side reactions and thermal degradation of the polyester. The impact compressing can be accomplished at room temperatures but superambient temperatures are preferred. The impact compressing is generally conducted at 200 to 700° F. and preferably 300 to 500° F. At temperatures below this range the density of the product is too low whereas at temperatures above this range the polyester tends to degrade. Furthermore, this process produces a void-free shaped polyester article.

Referring now to the drawings, and in particular to FIG. 1, there is schematically shown an apparatus 10 suitable for practicing the process of the present invention. The apparatus 10 comprises an upper die 11 and a lower die 12. The lower die 12 has a cavity 13 whereas the upper die 11 has a raised boss 14 adapted to snugly fit into the cavity 13 of the die 12, leaving a space having the shape of the shaped article desired to be produced. In operation a slug 15 of granular oxybenzoyl polyester which has been compressed sufficiently to hold the granules together is placed in the cavity 13 of the die 12. Thereafter, the die 11 and the die 12 are simultaneously caused to move toward each other by any suitable means, not shown. The dies 11 and 12 are caused to move in such a manner that their velocity prior to impact is greater than 40 and preferably greater than 60 feet per second. FIG. 2 shows the position of the dies 11 and 12 after impact whereupon the slug 15 has been transformed by impact energy into a shaped article 16. Selection of specific velocities of dies 11 and 12 considering their mass and considering the number of foot pounds of energy desired to impart to the slug 15 is well within the skill of the art. In general, shaped articles 16 weighing from 10 to 100 grams can be produced by imparting to a slug 15 an energy of from 10,000 to 150,000 foot pounds.

FIG. 3 shows an alternate apparatus 30 similar to the apparatus 10 wherein the upper die 31 has a boss 34 designed to produce a shaped article, not shown, having a depression therein corresponding to the shape of the boss 34.

FIG. 4 shows yet another apparatus 40 similar to the apparatus 10 but wherein the cavity 43 of the lower die 42 has a passageway 47 extending through the die 42 in a direction parallel to the direction of movement of the die 42.

The oxybenzoyl polyesters useful in the present invention are generally those of repeating units of Formula I:

(I) 

One preferred class of oxybenzoyl polyesters are those of Formula II:

(II)
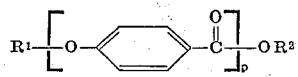

wherein R¹ is a member selected from the group consisting of benzoyl, lower alkanoyl, or preferably hydrogen; wherein R² is hydrogen, benzyl, lower alkyl, or preferably phenyl and $p$ is an integer from 3 to 600 and preferably 30 to 200. These values of $p$ correspond to a molecular weight of about 1,000 to 72,000 and preferably 3,500 to 25,000. The synthesis of these polyesters is described in detail in U.S. patent application Ser. No. 619,577 filed Mar. 1, 1967 and now abandoned, entitled "Polyesters Based on Hydroxybenzoic Acids," which is assigned to the assignee of the present application and the disclosure of which is incorporated herein by reference.

Another preferred class of oxybenzoyl polyesters are copolyesters of recurring units of Formulae I, III and IV:

(III)
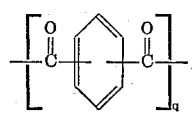

(IV)
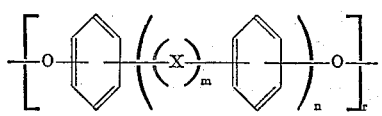

wherein X is —O— or —SO₂—; $m$ is 0 or 1; $n$ is 0 or 1; $q:r=10:15$ to 15:10; $p:q=1:100$ to 100:1; $p+q+r=3$ to 600 and preferably 30 to 200, these values corresponding to molecular weights of from 500 to over 72,000 and preferably from 3,500 to 25,000. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

The preferred copolyesters are those of recurring units of Formula V:

(V)
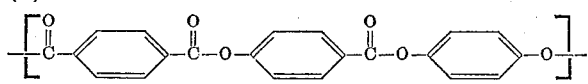

The synthesis of these polyesters is described in detail in U.S. patent application Ser. No. 828,484, filed concurrently herewith on May 28, 1969 entitled "P-Oxybenzoyl Copolyesters" which is assigned to the assignee of the present application and the disclosure of which is incorporated herein by reference.

The polyesters useful in the present invention can also be chemically modified by various means such as by inclusion in the polyester of monofunctional reactants such as benzoic acid or tri- or higher functional reactants such as trimesic acid or cyanuric chloride. The benzene rings in these polyesters are preferably unsubstituted but can be substituted with non-interfering substituents examples of which include among others halogen such as chlorine or bromine, lower alkoxy such as methoxy and lower alkyl such as methyl.

The polyesters useful in the present invention can be employed in their pure form, mixed with one another or with a wide variety of organic and/or inorganic fillers. Examples of suitable organic fillers include among others polyhalogenated addition polymers such as polytetrafluoroethylene and condensation polymers such as polyimides. Examples of suitable inorganic fillers include among others graphite, molybdenum disulfide, and glass fibers. These fillers can comprise up to 70 weight percent of the combined weight of polyester and filler.

The process of the present invention can be employed to produce shaped articles which find utility as gaskets, bearings, electrical insulation and substrates for printed circuits.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

A mixture of 856 g. of phenyl para-hydroxybenzoate, 0.015 g. of tetra-n-butyl orthotitanate and 1800 g. of a polychlorinated polyphenyl solvent (B.P. 360–370° C.) is heated, with constant stirring and under an atmosphere of flowing nitrogen, at 170–190° C. for 4 hours and then at 340–360° C. for 10 hours. Early in this heating cycle the mixture becomes a homogeneous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl solvent, and the product is dried overnight in vacuum at 60° C. A yield of 377 g. of polyester powder is obtained, consisting essentially of a para-oxybenzoyl polyester.

EXAMPLE 2

This example illustrates the synthesis of a copolyester useful in the present invention.

The following quantities of the following ingredients are combined as indicated.

| Ingredient | Quantity | |
|---|---|---|
| | Grams | Moles |
| Item: | | |
| A ............ p-Hydroxybenzoic acid ......... | 138 | 1 |
| B ............ Phenyl acetate ............... | 170 | 1.25 |
| C ............ Therminol 77 ................. | 500 | ......... |
| D ............ Diphenyl terephthalate ....... | 318 | 1 |
| E ............ Hydrogen chloride ............ | | |
| F ............ Hydroquinone ................. | 111 | 1.01 |
| G ............ Therminol 77 ................. | 500 | ......... |

Items A–D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180° C. whereupon HCl is bubbled through the reaction mixture. The outlet head temperature is kept at 110°–120° C. by external heating during the p-hydroxybenzoic acid, phenyl acetate ester exchange reaction.

The flask and its contents are stirred at 180° C. for 6 hours whereupon the HCl is shut off, the outlet head temperature raised to 180°–190° C. and the mixture stirred at 220° C. for 3.5 hours. Up to this point, 159 grams of distillate are collected in the condenser. Item F is then added and the temperature gradually increased from 220° C. to 320° C. over a period of 10 hours (10° C./hr.). Stirring is continued at 320° C. for 16 hours and then for three additional hours at 340° C. to form a slurry. The total amount of distillate, consisting of phenol, acetic acid and phenyl acetate, amounts to 384 g. Item G is added and the reaction mixture permitted to cool to 70° C. Acetone (750 ml.) is added and the slurry filtered, the solids are extracted in a Soxhlet with acetone to remove items C and G. The solids are dried in vacuo at 110° C. overnight whereupon the resultant copolyester (320 g., 89.2% of theory) is recovered as a granular powder.

EXAMPLE 3

A quantity of the granular polyester of Example 1 is compression molded at room temperature and 5,000 p.s.i. into a cylindrical slug 15 which is then placed in a cavity 13 of a die 12. The die 12 is secured to the lower platen of a high energy rate forging machine Model 500 C available from U.S. Industries Inc., 6499 W. 65th St., Chicago, Ill. The platens are caused to close at a velocity of about 65 feet per second to produce a shaped article 16, as shown in FIG. 2.

EXAMPLE 4

The procedure of Example 3 is repeated except that the polyester of Example 1 is replaced by an equal weight of the polyester of Example 2, and the apparatus employed is replaced by that shown in FIG. 3.

Although the invention has been described in considerable detail with reference to certain preferred embodiment thereof, it will be understood that variations and modifications can be effected within the spirit and scope of the invention as described above and as defined in the appended claims.

What is claimed is:

1. A process for forming substantially void-free shaped articles of an oxybenzoyl polyester comprising compressing granules of said polyester into a slug and impact compressing said slug into the desired shape at a temperature in the range from about room temperature to about 700° F. by imparting to said slug an energy of from 10,000 foot pounds to 150,000 foot pounds, said oxybenzoyl polyester having a molecular weight of at least about 3,500 and being infusible and being selected from the group consisting of:

(a) a polyester consisting essentially of from about 30 to about 200 recurring structural units of the formula

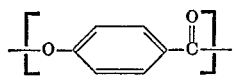

(b) a polyester consisting essentially of recurring structural units of Formulas I, III and IV (I) 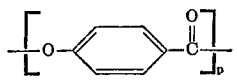

(III) 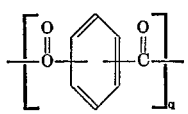

(IV) 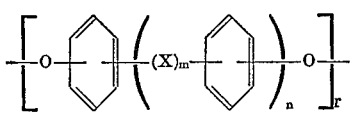

wherein X is —O— or —SO$_2$—; $m$ is 0 or 1; $n$ is 0 or 1; $q$:$r$=10:15 to 15:10; $p$:$q$=1:100 to 100:1; $p+q+r$=30 to 200; the carbonyl groups of the moiety of Formula I or III are linked to the oxy groups of the moiety of Formula I or IV; and the oxy groups of the moiety of Formula I or IV are linked to the carbonyl groups of the moiety of Formula I or III.

2. A process as set forth in claim 1 wherein said temperature is at least about 200° F.

3. A process as set forth in claim 1 wherein said temperature is within the range from about 300° F. to about 500° F.

4. A process as set forth in claim 1 wherein said oxybenzoyl polyester has a molecular weight of from 3,500 to 25,000 and consists essentially of from about 30 to about 200 recurring structural units of the formula

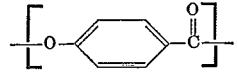

5. A process as set forth in claim 4 wherein said oxybenzoyl polyester has the formula

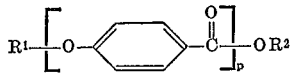

wherein R$^1$ is selected from the group consisting of benzoyl, lower alkanoyl and hydrogen; R$^2$ is selected from the group consisting of hydrogen, benzyl and phenyl; and $p$ is an integer from 30 to 200.

6. A process as set forth in claim 5 wherein R$^1$ is hydrogen and R$^2$ is phenyl.

7. A process as set forth in claim 1 wherein said oxybenzoyl polyester has a molecular weight of from 3,500 to 25,000 and consists essentially of recurring structural units of Formulas I, III and IV.

8. A process as set forth in claim 7 wherein $m$ is 0.

9. A process as set forth in claim 7 wherein $n$ is 0.

10. A process as set forth in claim 7 wherein said oxybenzoyl polyester consists essentially of recurring units of the formula

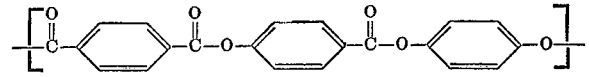

References Cited

UNITED STATES PATENTS

| | | | |
|---|---|---|---|
| 1,951,174 | 3/1934 | Simons | 264—323 |
| 2,728,747 | 12/1955 | Aelony et al. | 260—47 |
| 3,039,994 | 6/1962 | Gleim | 260—47 |
| 3,488,747 | 1/1970 | Cleereman | 264—312 |

OTHER REFERENCES

"Forging High Molecular Weight Polyethylene," Werner et al., S.P.E. Journal, December 1968, vol. 24, pp. 76–79.

"Forming Plastics by Metalworking Techniques," Coffman, S.P.E. Journal, January 1969, vol. 25 pp. 50–54.

ROBERT F. WHITE, Primary Examiner

J. R. THURLOW, Assistant Examiner

U.S. Cl. X.R.

260—47 C; 264—120, 294, 323, 331